(12) United States Patent
Schlesinger et al.

(10) Patent No.: US 10,079,737 B2
(45) Date of Patent: Sep. 18, 2018

(54) METHOD AND SYSTEM FOR GENERATING COMPARABLE VISUAL MAPS FOR BROWSING ACTIVITY ANALYSIS

(71) Applicant: Clicktale Ltd., Ramat Gan (IL)

(72) Inventors: Mark Nati Schlesinger, Raanana (IL); Arik Yavilevich, Ashdod (IL)

(73) Assignee: Clicktale Ltd., Ramat Gan (IL)

( * ) Notice: Subject to any disclaimer, the term of this patent is extended or adjusted under 35 U.S.C. 154(b) by 293 days.

(21) Appl. No.: 14/484,726

(22) Filed: Sep. 12, 2014

(65) Prior Publication Data

US 2015/0082135 A1  Mar. 19, 2015

Related U.S. Application Data

(60) Provisional application No. 61/877,452, filed on Sep. 13, 2013.

(51) Int. Cl.
| | |
|---|---|
| *G06F 17/00* | (2006.01) |
| *H04L 12/26* | (2006.01) |
| *G06F 17/30* | (2006.01) |
| *G06F 17/22* | (2006.01) |
| *H04L 29/08* | (2006.01) |

(52) U.S. Cl.
CPC ........ *H04L 43/045* (2013.01); *G06F 17/2235* (2013.01); *G06F 17/3089* (2013.01); *H04L 67/22* (2013.01)

(58) Field of Classification Search
CPC .............................................. G06F 17/3089
USPC ....................................................... 715/234
See application file for complete search history.

(56) References Cited

U.S. PATENT DOCUMENTS

| | | | | | |
|---|---|---|---|---|---|
| 5,787,253 | A | * | 7/1998 | McCreery | H04L 29/06 370/351 |
| 5,961,598 | A | * | 10/1999 | Sime | H04L 41/22 707/999.104 |
| 6,006,222 | A | * | 12/1999 | Culliss | G06F 17/30864 |
| 6,182,068 | B1 | * | 1/2001 | Culliss | G06F 17/30699 707/721 |
| 6,285,999 | B1 | * | 9/2001 | Page | G06F 17/30728 |
| 6,321,228 | B1 | * | 11/2001 | Crandall | G06F 17/30864 |

(Continued)

FOREIGN PATENT DOCUMENTS

RU      2435212 C2     11/2011

OTHER PUBLICATIONS

The International Search Report and the Written Opinion of the International Searching Authority for PCT/US2014/055376, ISA/RU, Moscow, Russia, dated Dec. 25, 2014.

*Primary Examiner* — Mohammed-Ibrahim Zuberi
(74) *Attorney, Agent, or Firm* — M&B IP Analysts, LLC (57) ABSTRACT

Certain embodiments disclosed herein include a method and system for generating comparable visual maps for browsing activity analysis. A first visual map is generated respective of a web-page and a first set of parameters and a second visual map is generated respective of the web-page and a second set of parameters. In one embodiment, the second set of filter parameters is populated based on the first set of parameters and includes at least one filter parameter in difference. The second visual map is comparable to the first visual map, wherein the first and second visual map are rendered and displayed within a single display window.

20 Claims, 7 Drawing Sheets

(56) References Cited

U.S. PATENT DOCUMENTS

| | | | | |
|---|---|---|---|---|
| 6,434,745 B1* | 8/2002 | Conley, Jr. | G06Q 30/02 | 707/999.01 |
| 6,667,751 B1* | 12/2003 | Wynn | G06F 17/30876 | 707/E17.112 |
| 6,684,250 B2* | 1/2004 | Anderson | H04L 29/12009 | 370/392 |
| 7,031,961 B2* | 4/2006 | Pitkow | G06F 17/30884 | |
| 7,398,271 B1* | 7/2008 | Borkovsky | G06F 17/30864 | |
| 7,565,367 B2* | 7/2009 | Barrett | G06F 17/30867 | |
| 7,831,548 B1* | 11/2010 | Round | G06F 17/30893 | 707/609 |
| 7,921,109 B2* | 4/2011 | Parikh | G06F 17/30867 | 707/731 |
| 8,001,118 B2* | 8/2011 | Dean | G06F 17/30864 | 707/706 |
| 8,041,711 B2* | 10/2011 | Walker | G06F 17/30855 | 707/723 |
| 8,204,966 B1 | 6/2012 | Mendis et al. | | |
| 8,548,991 B1* | 10/2013 | Zamir | G06F 17/30884 | 707/723 |
| 8,914,362 B1* | 12/2014 | Zamir | G06F 17/30884 | 707/732 |
| 8,914,736 B2* | 12/2014 | Cardasco | G06F 11/3006 | 715/234 |
| 9,753,605 B2* | 9/2017 | Chen | G06F 3/04817 | |
| 9,858,329 B2* | 1/2018 | Laligand | G06F 17/30598 | |
| 2002/0186237 A1* | 12/2002 | Bradley | G06F 11/32 | 715/736 |
| 2004/0267815 A1* | 12/2004 | De Mes | G06F 17/3089 | |
| 2005/0071741 A1* | 3/2005 | Acharya | G06F 17/30864 | 715/208 |
| 2005/0102282 A1* | 5/2005 | Linden | G06F 17/3053 | |
| 2006/0004711 A1* | 1/2006 | Naam | G06F 17/30867 | |
| 2006/0047643 A1* | 3/2006 | Chaman | G06F 17/30867 | |
| 2006/0123014 A1* | 6/2006 | Ng | G06F 17/30864 | |
| 2006/0224587 A1* | 10/2006 | Zamir | G06F 17/30867 | |
| 2006/0224938 A1* | 10/2006 | Fikes | G06F 17/30876 | 715/234 |
| 2006/0230058 A1* | 10/2006 | Morris | G06F 17/3089 | |
| 2007/0100824 A1* | 5/2007 | Richardson | G06F 17/30864 | |
| 2007/0100992 A1* | 5/2007 | Wong | G06F 17/3089 | 709/224 |
| 2007/0112730 A1* | 5/2007 | Gulli | G06F 17/30864 | |
| 2007/0244657 A1* | 10/2007 | Drago | H04B 5/02 | 702/81 |
| 2007/0250855 A1* | 10/2007 | Quinn-Jacobs | G06F 17/30696 | 725/35 |
| 2007/0276790 A1* | 11/2007 | Walsh | G06F 17/30861 | |
| 2008/0189281 A1* | 8/2008 | Cancel | G06Q 30/02 | |
| 2008/0306830 A1 | 12/2008 | Lasa et al. | | |
| 2012/0259866 A1 | 10/2012 | Austin et al. | | |
| 2013/0054622 A1* | 2/2013 | Karmarkar | G06F 17/30032 | 707/749 |
| 2014/0143652 A1* | 5/2014 | DeLoach | G06F 17/212 | 715/234 |
| 2014/0173418 A1* | 6/2014 | Seifert | G06F 17/24 | 715/234 |
| 2015/0066579 A1* | 3/2015 | de Paris | G06Q 30/0201 | 705/7.29 |
| 2015/0254219 A1* | 9/2015 | Harel | G06Q 30/00 | 715/234 |

* cited by examiner

METHOD AND SYSTEM FOR GENERATING COMPARABLE VISUAL MAPS FOR BROWSING ACTIVITY ANALYSIS

CROSS-REFERENCE TO RELATED APPLICATIONS

This application claims the benefit of U.S. Provisional Application No. 61/877,452 filed on Sep. 13, 2013, the contents of which are hereby incorporated by reference.

BACKGROUND

The Internet is a collection of disparate computer systems which use a common protocol to communicate with each other. A common use of the Internet is to access web pages via the World Wide Web. Web pages are typically stored on a server and remotely accessed by a client over the Internet using a web browser.

A web site is a collection of web pages. A web site typically includes a home page and a hierarchical order of follow-on web pages that are accessible through the home page. The web pages are connected to each other using hypertext links. The hypertext links allow a user to browse web pages of a web site by selecting the links between the web pages. Distinct web sites may be identified by their respective and distinctly associated Internet domain names.

To increase user visitations and revenue, web sites have become increasingly robust and sophisticated. Web sites typically include web pages that provide information to users, advertise products or services to users, and/or provide site search functions for users. However, a problem for web site owners is how to determine how successful their web site is, for example, whether the informational or other needs of users are met and if the users are purchasing goods and services advertised on their site.

Programs for analyzing traffic on a network server, such as a web server, are discussed in the related art. In these prior art systems, the program typically runs on the web server that is being monitored. Data is compiled, and reports are generated on demand or are delivered from time to time via email to display information about web server activity such as, but not limited to, the most popular page by number of visits, peak hours of website activity, most popular entry page, and so on. Alternatively data is logged on the web server that is being monitored and the logs are transferred to another computer, where they are compiled and analyzed.

Another technique for collecting web site analytics is by means of a client side script embedded in web pages to monitor traffic. Such a script can collect information and submit the information to a central server where the information is analyzed and stored. The script runs on a client device that typically collects URLs that a user visits, mouse movement, scrolling of web pages, resizing of browser windows, click events, keyboard use ("per-action" data), the sequence of the visited URLs, and so on. The collected information is typically assembled and sent "per-page" together with the identification of the client (e.g., an IP address) to the central server.

Prior art solutions limit the information collected on the client side to "per-page" data such as: URL, referrer, load time, IP, browser type, screen resolution, and so on. The "per-page" data resembles data that was previously collected on the server side in the form of web logs. A web server only knows about page requests. As a result, web logs only contain "per-page" data. Conversely, client side data collection is not limited to "per-page" data, but simply evolved as such since initially it was developed as a replacement for traditional server logs. For example, data accessible to client side scripts includes, but is not limited to, mouse movement, scrolling of a web page, resizing of a browser window, click events, keyboard use, and so on ("per-action" data).

Although prior art solutions for monitoring browsing activity collect many details with regard to the activity, such solutions fail to provide an easy and intuitive mechanism for analyzing the gathered information. For example, the monitoring solutions may provide the gathered information by way of textual reports, graphs generated respective of such reports, or by way of visual maps. However, as the analysis of the browsing activity can be performed at different levels, it requires a user to review many reports and to compare between different metrics. As a result, the user cannot easily compare between two or more data sets related to the browsing behavior of a specific web-page. For example, comparing the number of mouse clicks recorded on the same web page during two different dates would require a user to review a first "mouse click" report (graph) for a first date and a second report for the second date, and to compare between such reports or graphs.

Typically to view multiple reports or graphs, the user has to open multiple windows on his/her desktop to present each report. Furthermore, each report is generated independently. As a result, the user is required to re-select the data set and the parameters to generate and display each report.

Therefore, it would be advantageous to provide an efficient tool for analyzing users' browsing activity.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

The disclosure relates in various embodiments to a method and system for generating a plurality of comparable visual maps of browsing activity of users. The method includes receiving a first set of parameters for generating a first visual map, wherein the first set of parameters includes at least a uniform resource locator (URL) of a webpage on which the browsing activity is monitored; retrieving, based on the selected first set of parameters, a first dataset including browsing activity data; generating a first visual map using the first dataset and content of the webpage; receiving a second set of parameters for generating a second visual map, wherein the second set of parameters is comparable to the first set of parameters; retrieving, based on the selected second set of parameters, a second dataset including browsing activity data; generating a second visual map using the second dataset and the content of the webpage; scaling the first visual map and the second visual map to provide comparable values relative to each other; and displaying the scaled first visual map and the scaled second visual map in a display window.

BRIEF DESCRIPTION OF DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 1:
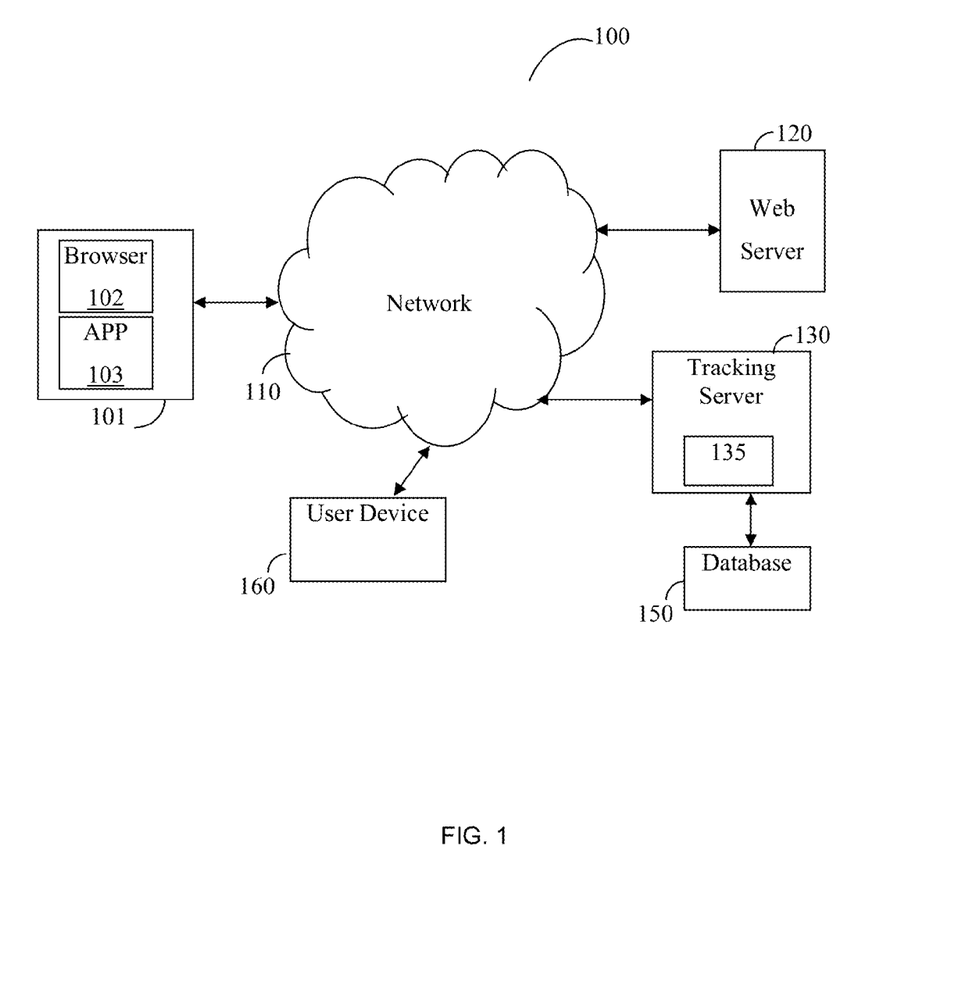
FIG. 1 is a diagram of a network system utilized to describe the various embodiments disclosed herein.

FIG. 1 shows an exemplary and non-limiting diagram of a network system 100 utilized to describe the various disclosed embodiments. The network system 100 includes a client device 101 connected to a network 110. A web server 120 and a tracking server 130 are also connected to the network 110. The tracking server 130 processes and analyzes user activity information collected by a tracking code executed in the client device 101.

The tracking server 130 is configured to generate visual maps and/or reports showing areas in a web page downloaded from the web server 120, wherein the shown areas are areas which a user of the client device 101 most interacted with and/or viewed. The visual maps may be graphically presented as heat maps. The visual maps can be generated at a pageview level, at a user level, at a web page level, at a logical state, and at a webpage level. Examples for logical states include browser tabs, browser windows, different web pages addressed by the same URL, single applications, and so on. The tracking server 130 is connected to a database 150, which is utilized to maintain the collected information related to the browsing activity, the visual maps at their various levels, and so on. The information saved in the database 150 is secured. In an embodiment, the database 150 is not secured, but the access to the information stored therein is secured. Techniques for securing data saved in the database 150 are discussed further herein below with respect to FIGS. 3A and 3B.

According to various embodiments, the tracking server 130 also provides an analysis tool 135. The tracking server may be configured to generate comparable visual maps via the analysis tool 135. In an embodiment, a plurality of comparable visual maps are displayed over the displays of the device 160 side-by-side in a single window display, such as a program window, a browser window, a web page, and so on. The comparable visual maps present the browser activities of a user of the client 101 at different view levels (e.g., page view, user level, etc.), using various comparator parameters (or filter parameters), and/or type of the monitored user browsing activity. Such parameters may include, but are not limited to, dates, events (e.g., visitor and page events), demographics (countries, languages, visitors IDs), technical information (e.g., browser type, operating system time, screen resolutions, fold heights), traffic source (e.g., visitor traffic sources, marketing channel, keywords, etc.), bounce rates, and so on. The user browsing activity relates to mouse movement, scrolling of web pages, resizing of browser windows, click events, keyboard uses, a touch screen display, orientation change, touch start, touch move, and touch end, and so on.

In another embodiment, the analysis tool 135 is configured to generate the difference between two or more visual maps and to display a difference map over the client device 101.

The tracking server 130 may include an interface (not shown in FIG. 1) for receiving user activity information representative of activities performed by the user during a visit to a web page, and to receive web page content information representative of the web page content displayed to the user during the visit. The information received through the interface may be compressed. The tracking server 130 also includes a processor (not shown in FIG. 1) configured to at least decompress the received data and generate the visual maps and other analytic reports provided by the analysis tool 130. The embodiments of the analysis tool 135 and the tracking server 130 are described in greater detail below.

The web server 120 can host a web site accessed through a browser 102 of the client device 101. The web server 120 may also execute an application that provides functionality and contents to a mobile application 103 (or APP) executed over the client device 101. The teachings disclosed herein can be utilized to generate the visual maps and other analytic data of either the web pages of a web site displayed over a browser 102 or the content displayed over a mobile application 103. Without limiting the scope of the invention and merely for the sake of simplicity, the description herein below will be made with reference to the browser 102 displayed over one client device 101. It should be noted that the disclosed teachings are not limited to content retrieved from one server 120 and displayed over the client device 101. The browser 102 can render display content retrieved from a plurality of servers, web servers, and/or application servers.

The client device 101 may be, but is not limited to, a smart phone, a tablet computer, a personal computer, a laptop computer, a netbook computer, an electronic reader, and the like. The browser 102 may be any web browser such as, but not limited to, Safari®, Firefox®, Internet Explorer®, Chrome®, and the like. The processor of the client device 101 runs an operating system that may include iOS®, Android®, Unix®, Windows®, and the like. The mobile application 103 may be any application that is executable over the client device 101 and/or an extension of the browser 102. The mobile application 103 is typically downloaded from a central repository such as, but not limited to, App-Store® by Apple Computers®, Google® Play®, and the like.

The recording process of browsing activity of a user of the client device 101 is discussed in greater detail in co-pending U.S. patent application Ser. No. 13/888,942 and U.S. Pat. No. 7,941,525, both of which are assigned to the common assignee and incorporated herein by reference for all that they contain.

The operation of the analysis tool 135 in generating the comparable side-by-side visual maps will be discussed with reference to FIGS. 2A-2B. A user of the device 160 can access the analysis tool 135 through a web browser or an application installed on the device. In either configuration, a connection is established between the device 160 and the tracking server 130. The server 130 is configured to retrieve information from the database 150 and to operate the analysis tool 135 responsive to requests received from a user of the device 160.

Figure 2A:
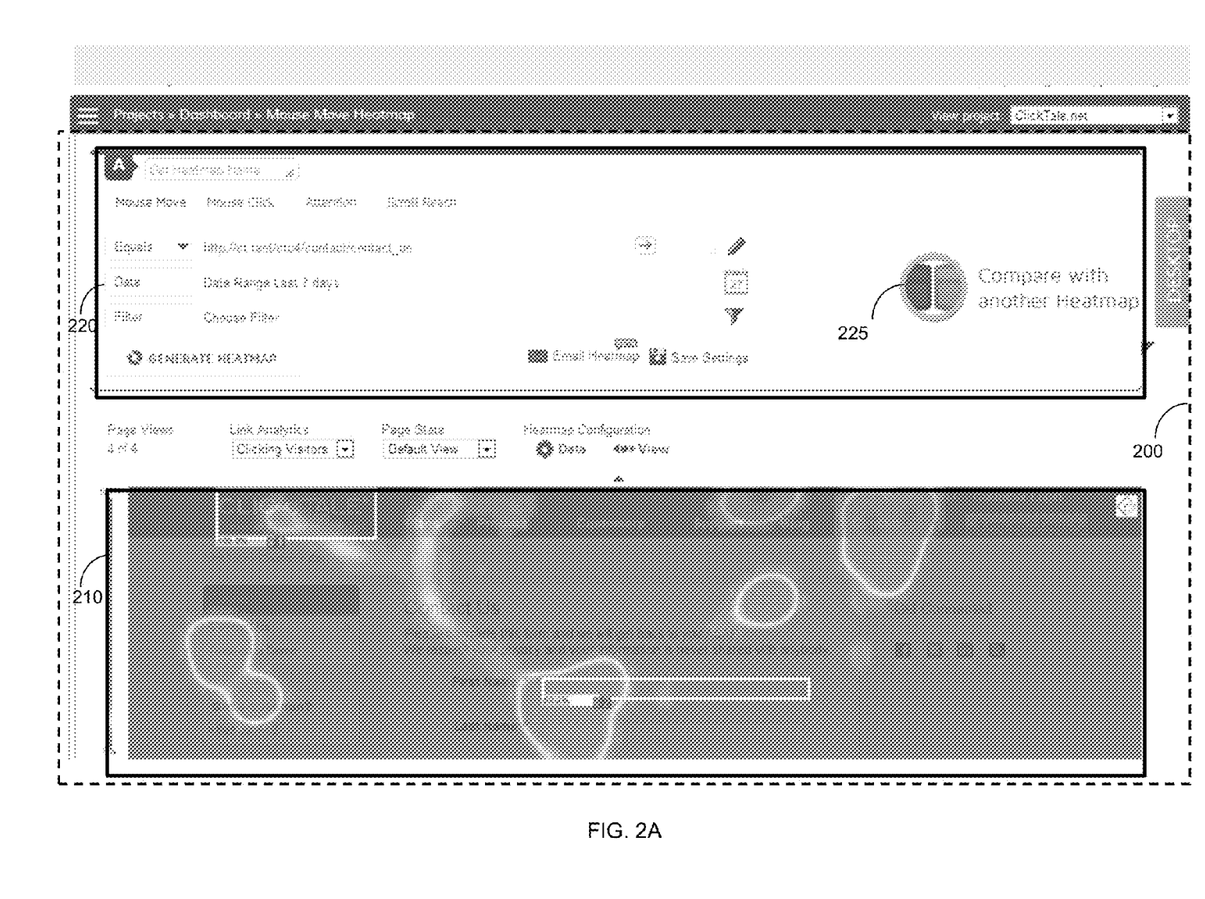
FIGS. 2A and 2B are exemplary screenshots of comparable maps generated according to one embodiment.

As shown in the exemplary screenshot illustrated in FIG. 2A, a first visual map 210 is created and displayed. The first visual map 210 is generated for a designated web-page showing the mouse movements over the web-page during one week. As can be noted, the map 210 is generated in response to one or more parameters selected in the parameter area 220 in a single window 200. A non-limiting list of filter parameters is provided above. Once the first visual map 210 is created and displayed, the user can create a second visual map (not shown) that may be compared to the first map. This second visual map can be requested, for example, by clicking the compare button 225.

Figure 2B:
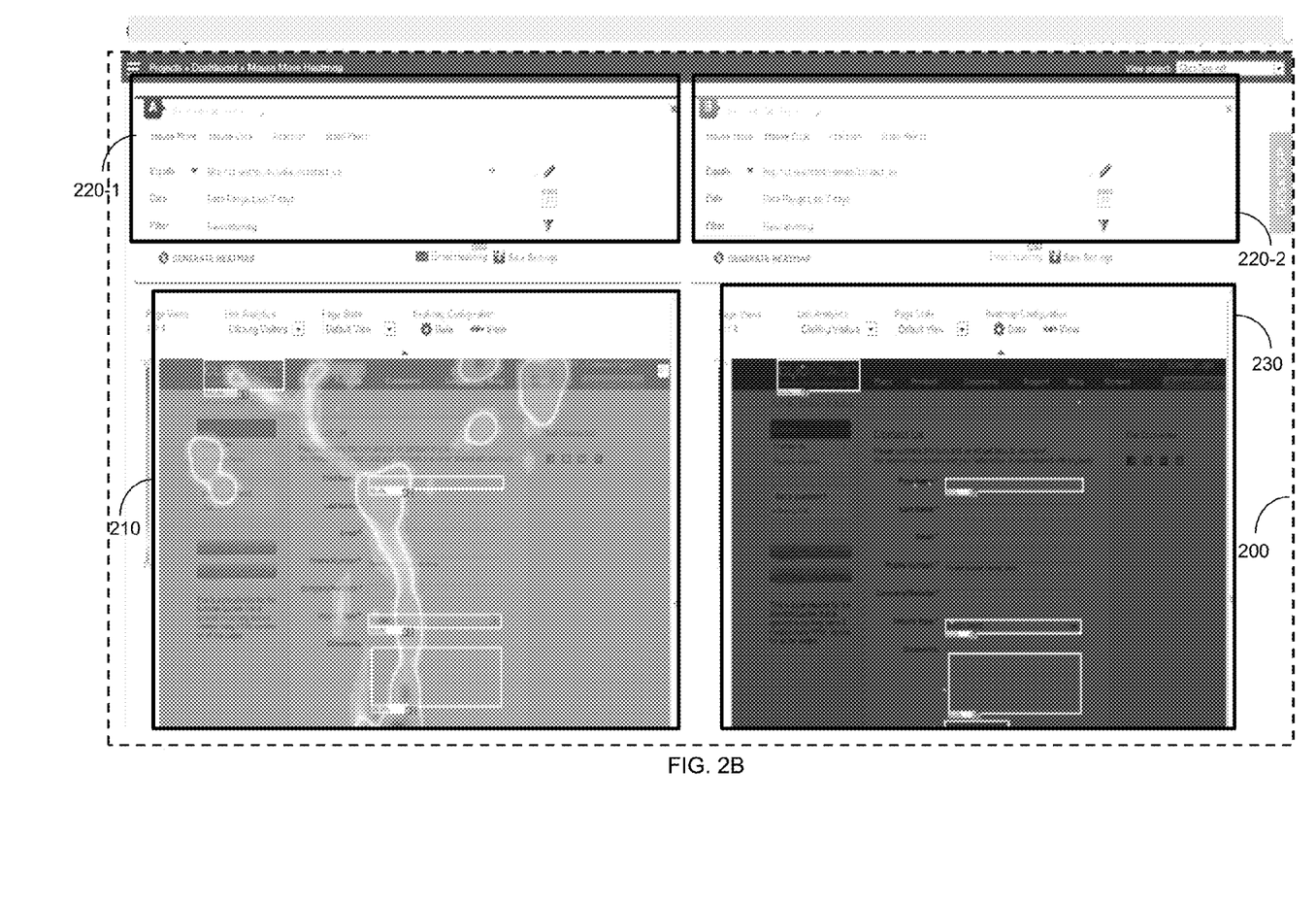

Responsive to such a request, the single display window 200 is divided into two sections, as shown in the exemplary screenshot provided in FIG. 2B. The parameters displayed in the parameter area 220-2 are populated based on information contained in the parameter area 220-1. The user can select the parameters to generate the comparable visual map 230. It should be noted that the single display window 200 may be a window of a web browser or an application providing an access to an analysis tool (e.g., the analysis tool 135).

As shown in the exemplary screenshot illustrated in FIG. 2B, the first visual map 210 is created and displayed in a left portion of the window 200. In this example, the first visual map 210 shows the mouse movements on the web-page during the preceding week, while the right visual map 230 shows the mouse clicks on the web-page during the last 7 days. It should be appreciated that the visual maps 210 and 230 allow the user to easily compare between the mouse movements and mouse clicks recorded for the same web-page during the last 7 days.

The user does not need to go through the process of selecting a web page and parameters when a comparable visual map is selected, as this information is automatically populated when the user selects the compare button. The user generally only needs to tune the parameter(s) to generate a comparable metric that the user wishes to analyze. It should be further appreciated that the single display window 200 can be further divided into more than two sections (or portions), each of which may contain a comparable visual map and its relative parameters. In an embodiment, recommendations with regard to comparator parameters that can provide useful and meaningful insights are generated and provided to the user.

In order to provide comparable views, each map is proportionally resized to a page view on a client device (e.g., the client device 101) and is proportionally resized to relative to the other map. Furthermore, datasets utilized to generate the maps are calibrated to allow a real comparable dataset between two or more maps. As a result, the visual data of the maps such as, e.g., color code, is also rescaled or calibrated to show comparable data. This ensures that the user can analyze the maps with respect to the same page view. In an embodiment, the scaling of the maps proportionally to each other is performed respective of a ratio predetermined based on the number of visual maps required to be displayed in the single window 200, the width of each window, and the width of each map. It should be noted that only two maps are shown in FIG. 2B, merely for the sake of simplicity. As noted above, more than two visual maps can be rendered and displayed in the single display window 200. In another embodiment, the visual map may be any type of aggregation report.

It should be further noted that, although the plurality of maps are displayed over the signal display window 200, some details associated with one map cannot be retrieved by the other maps displayed in the same window. For example, confidential recorded data utilized to generate a first visual map 210 cannot be retrieved or shared with the right visual map 230 even though the visual maps 210 and 230 are displayed of the same page. With this aim, each map is generated as layers of secured and unsecured data sets.

In this embodiment, the separation between maps or data layers within the maps is controlled by placing the maps or data layers in different domains or sub-domains also known as "origins". Data layers or maps in different origins can only communicate via a mutually agreed protocol and cannot communicate in an unrestricted fashion. In an embodiment, to ensure data security and isolation between the maps, logic managers are also utilized as further described herein below with respect to FIGS. 3A and 3B.

Figure 3A:
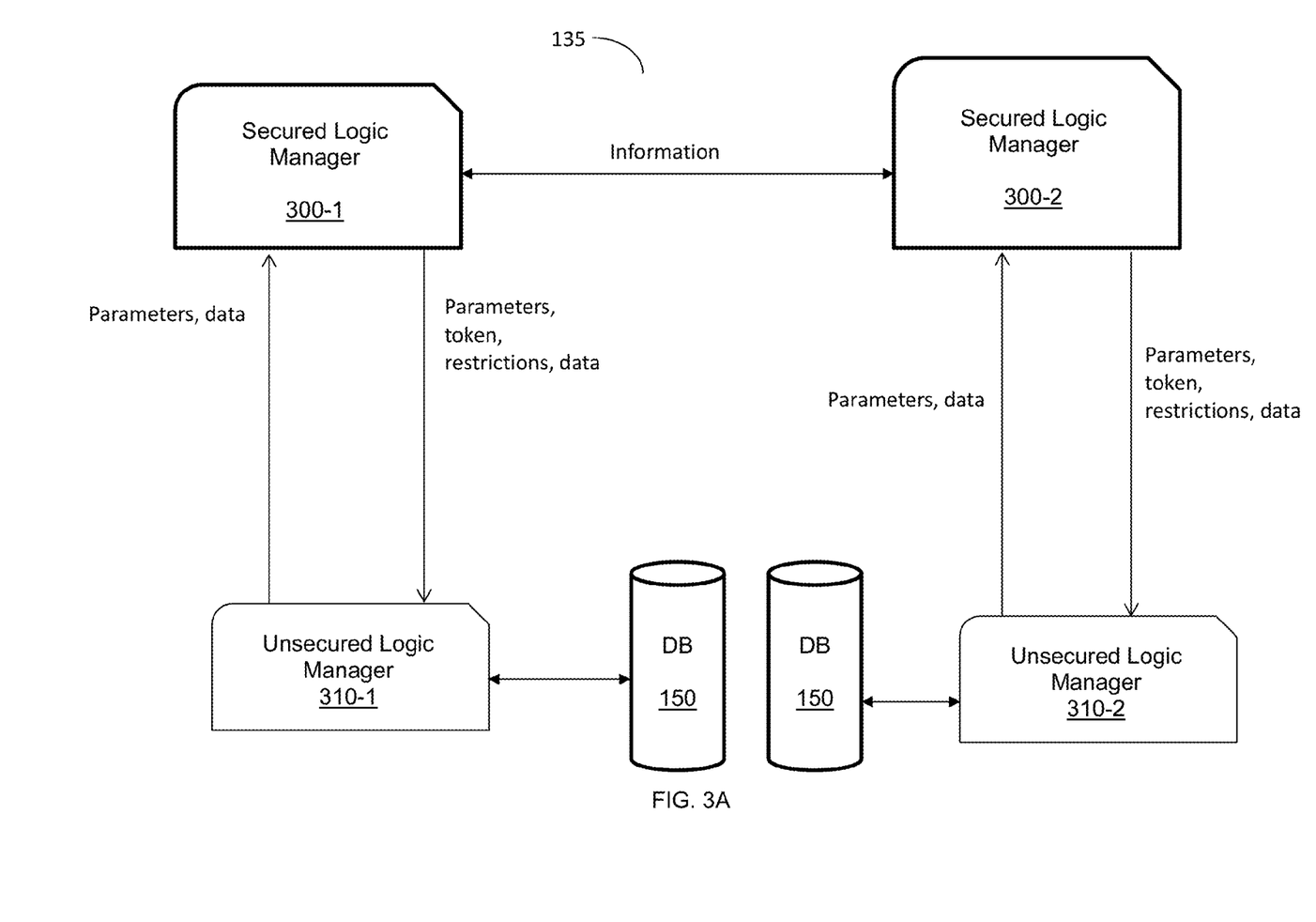
FIGS. 3A and 3B are diagrams illustrating retrieving datasets from databases in a secured manner according to one embodiment.

Referring now to FIG. 3A, the secured logic managers 300-1 and 300-2 (hereinafter referred to collectively as secured logic managers 300 or individually as a secured logic manager 300) are instantiated for two maps and can exchange information related to the two maps, e.g., the parameters of the first map are sent to the second map. The unsecured logic managers 310-1 and 310-2 (hereinafter referred to collectively as unsecured logic managers 310 or individually as an unsecured logic manager 310) are also instantiated for the two maps. Each unsecured logic manager 310 can communicate only with its respective secured manager 300 (e.g., communication is allowed between unsecured logic manager 310-1 and secured logic manager 300-1).

To allow secured connection between secured logic manager and its respective unsecured logic manager, a token is utilized for communication purposes. For example, the secured logic manager 300-1 sends a token to the unsecured logic manager 310-1. Each unsecured logic manager 310-1 and 310-2 can access recorded information in the unsecured zone of a database (e.g., the database 150). Such a zone contains, for example, contents of web pages addressed by the URLs and previously generated visual maps, but does not include details of the recorded browsing activities (e.g., log files).

The secured logic manager 310 may limit its respective unsecured manager with a set of restrictions as to which data it can access and may further provide a token required to access secured data. In one embodiment, the unsecured logic manager 310 can be operable in a server (e.g., the server 130) and in a user device (e.g., the user device 160).

To generate a visual map, any of the unsecured logic managers 310-1 or 310-2 is configured to gather and process information without any restrictions such as, but not limited to, the web-page content (for which the map is created) and the parameters and filters selected by the user. The configured secured logic manager 300-1 or 300-2 is further configured to gather and process readily accessible information and/or restricted information such as, e.g., number of page clicks from a specific client device. The information is rendered as part of the map and displayed only to a user having the proper authorization. Furthermore, the restricted information presented in one map cannot be displayed or retrieved (e.g., by malicious code) by or from the second map.

Figure 3B:
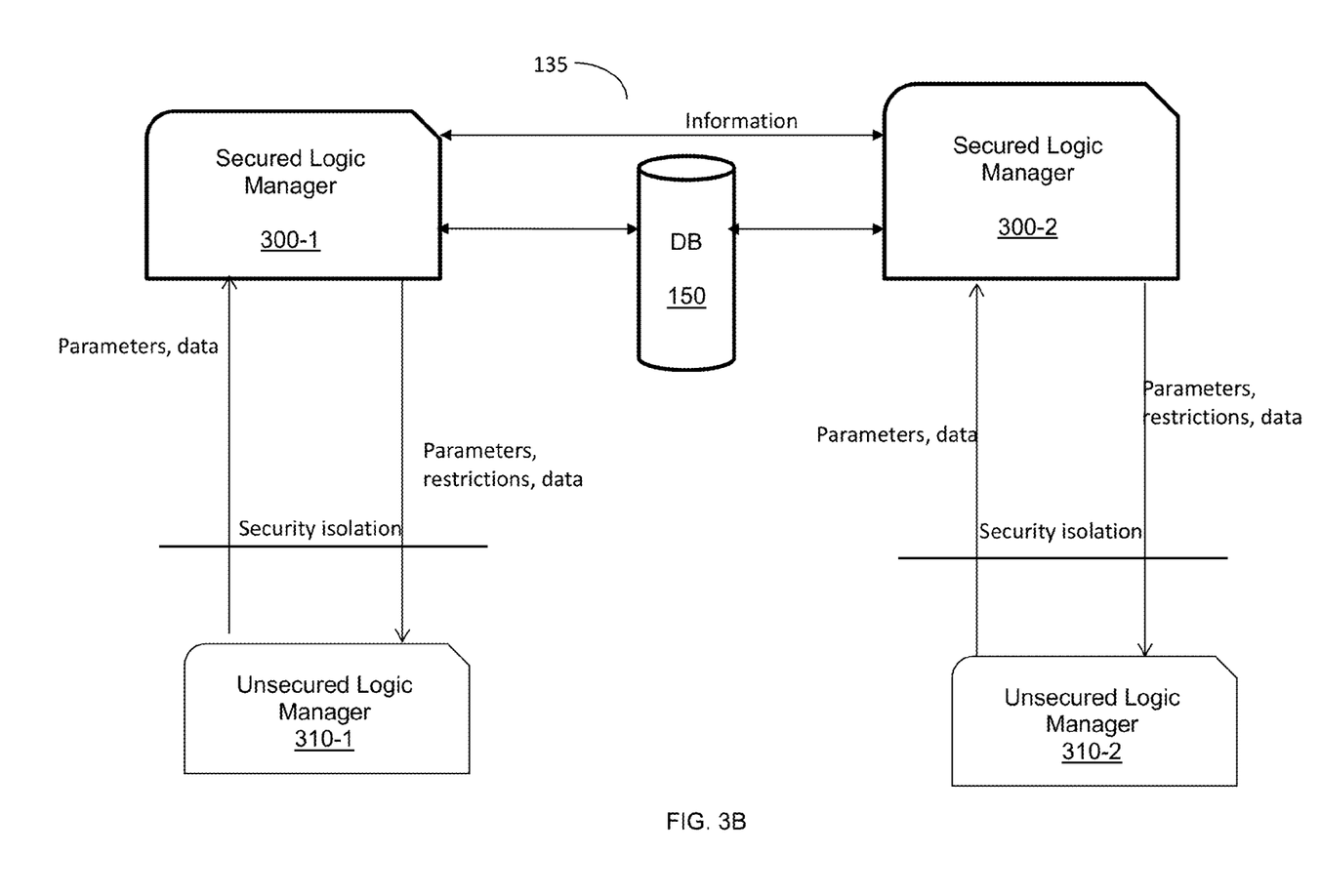

Referring now to FIG. 3B, in which another embodiment to allow access to the database 150 is shown. In this embodiment, the secured logic managers 300-1 and 300-2 communicate with the database 150. The communication with the unsecured logic managers 310-1 and 310-2 is performed by the respective secured logic managers 300-1 and 300-2, through a security isolation layer that applies a predefined set of restriction rules.

Figure 4:
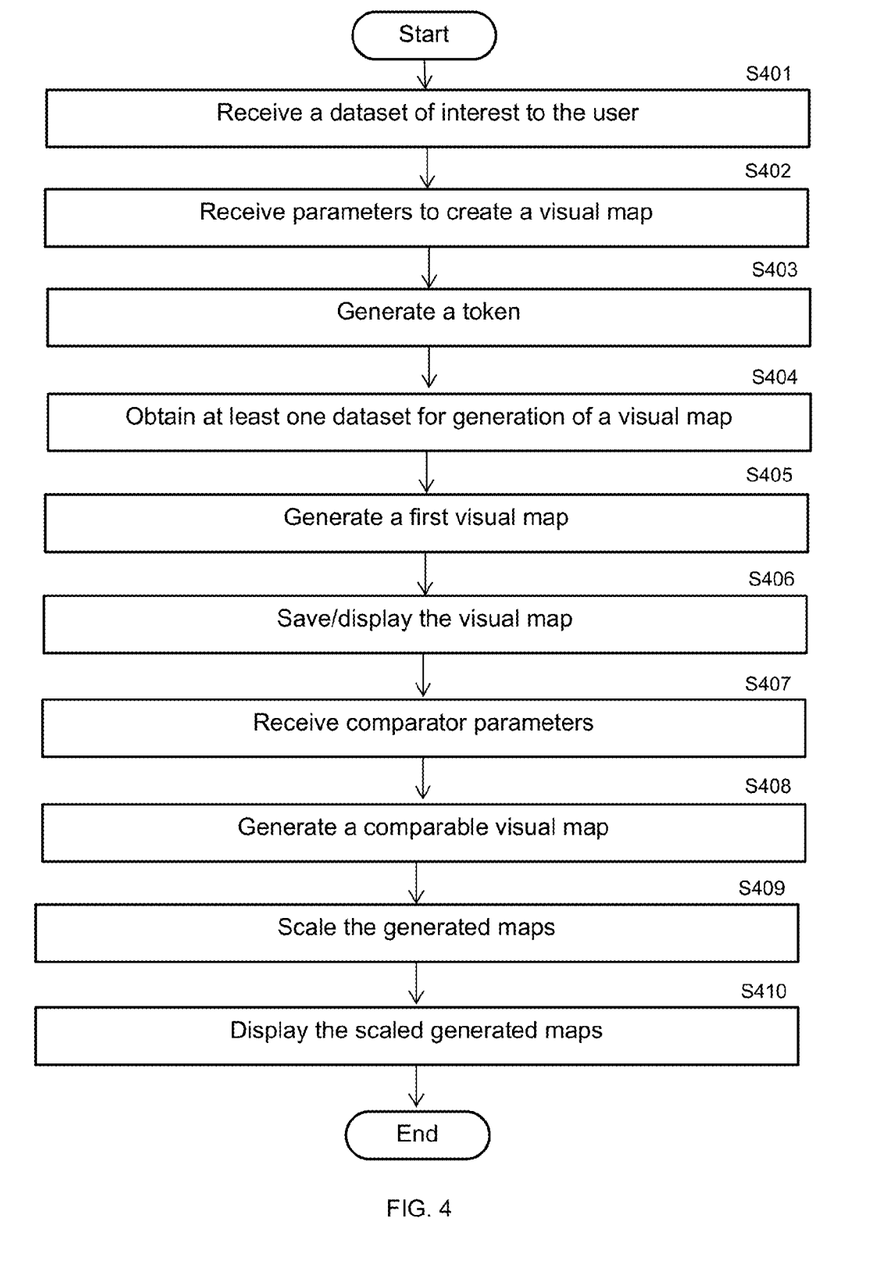
FIG. 4 is a flowchart illustrating a method generating comparable visual maps according to one embodiment.

FIG. 4 shows an exemplary and non-limiting flowchart 400 illustrating a method for generating and displaying a plurality of comparable maps according to one embodiment. The method, in an exemplary implementation, is executed by the tracking server 130.

At S401, a predefined dataset which may be of interest to the user to analyze is received. For example, the data may include an insight indicating that a specific URL should be analyzed. In an embodiment, S401 is an optional step.

At S402, parameters required for creating a first visual map are received. These parameters are typically selected by the user wishing to analyze the recorded tracking data. The parameters may include, for example, a URL of a web-page to analyze, a data range, a map type, and one or more filter parameters. The filter parameters may include, for example, dates, events (e.g., visitor and page events), demographics (e.g., countries, languages, and visitors IDs), technical information (e.g., browser type, operating system time, screen resolutions, fold heights), traffic source (e.g., visitor traffic sources, marketing channel, keywords, etc.), bounce rate, and so on. In an embodiment, the parameter includes at type of user activity to analyze. Such activity includes, for example, mouse movements, keyboard uses, touch screen events, a combination thereof, and so on. In one embodiment, the parameters are sent from an unsecured logic manager to the secured logic manager.

At S403, a token is generated based on the received parameters. In an embodiment, the token is generated using the secured logic manager and sent to the respective unsecured logic manager as discussed above. S403 may also include configuring the unsecured logic manager with a set of restrictions as to the type of data that can be retrieved by the unsecured logic manager and the content of the web page that should be retrieved. The content of the web page may be a cached version of the web page, an image of the web page, and the like. In certain exemplary embodiments, the token may be a random number concatenated with the received parameters. As noted above, the token is required to access secured recorded data. Such data may be saved in a database (e.g., the database 150).

At S404, at least one dataset required for generation of the visual map is retrieved from the database (e.g., the database 150). The data is obtained using the token and the restrictions set by the respective secure logic manager. At S405, the visual map is generated based on the selected parameters and the retrieved data. The visual map is generated in response to the user browsing activity information and the web page content information collected and recoded by the tracking server 130. The generation of the visual map may include rendering a map with a visualization layer (in the form of, e.g., HTML, HTML5, Flash, etc.) and one or more data layers (e.g., link analytics, drilldown to recorded logs, etc.). The visualization layer and/or the data layers are rendered over a cached version of the web-page. The visualization layer is generated in such a way that only useful and meaningful visual data is displayed with reference to the presented version of the web-page. In one embodiment, the visual map is in the form of a heat map. An example for a heat visual map can be found in U.S. Pat. No. 7,941,525, assigned to common assignee, which is hereby incorporated by reference for all the useful information it contains. At S406, the first generated visual map is saved in, for example, the database 115. Alternatively or collectively, the generated map is displayed over the display window.

At S407, a new set of comparator parameters as selected by the user are received. The comparator parameters are utilized to generate a second (comparable) visual map to be displayed along-side the first generated map in a section of the window allocated to the second visual map. In addition, the generated visual map is placed in its allocated section.

At S408, a new comparable visual map is generated responsive to the selection of the comparator parameters. The generation of the comparable visual map may be performed by repeating steps S402 through S406 as discussed above. It should be noted that the token provided for the comparable visual map is different than the token of the first visual map, as these tokens are handled by different logic managers. Further, as the comparator parameters selected in S406 may be different, the parameters selected to create the first map (i.e., the dataset retrieved at S404 for the generation of the comparable map) may be different then the dataset used for the first map. A cached version of the web-page may be the same.

The visual maps generated as described above, for example, the first visual map and the respective comparable visual map are displayed with the retrieved dataset for each map according to the selected parameters. For example, if the dataset of the first visual map is the number of page mouse-clicks during a week and the comparable visual map during a month. These datasets are presented as part of the generated visual maps. The data values may be set as overlay over the presented map. A visual map may be displayed as a heat map where the different colors correspond to different data values of the dataset.

In an embodiment, at S409, the datasets utilized for generation of the visual maps are further calibrated, thereby rescaling the maps generated at S406 and S408 to show comparable data. Such calibration allows for a real comparable dataset between two or more comparable maps. The datasets are calibrated or scaled based, in part, on a set of values recorded for at least one parameter. The scaling of the visual maps ensures that the datasets' values utilized in the generation of the maps are relative to each other. When heat maps are generated, scaling allows presentation of the data on the same color code.

In an embodiment, the scaling of the visual maps is performed using a set of maximum recorded values. In each generated visual map, the maximum value for each monitored object in the web-page with respect to the selected parameters may be determined. This determination may be performed by scanning all values in the respective data set. The maximum value of the map is computed as the ratio between the maximum value and the number of page views. That is, the maximum value of the map (maxValueLeft, maxValueRight) is computed as follows:

maxValueLeft=Maximum Object Value Left/Page View Left;

maxValueRight=Maximum Object Value Right/Page View Right

The scaling factor (newMaxValue) for the two maps is determined to be the maximum value between maxValueLeft and maxValueRight, i.e., newMaxValue=max (maxValueLeft, maxValueRight). The values of the dataset used to generate the two visual maps are scaled relative to the scaling factor. An example for the scaling process is provided below with reference to FIG. 5.

It should be noted that the scaling can be performed using statistical values other than the maximum values. Such values may include, for example but not limited to, minimum values, average values, absolute values, and so on. It should be noted that the scaling factor may be further normalized using, a mathematical or statistical function, such as a log function or a function of a number of page views. The number of page views is the number of times that the web page addressed by the URL was viewed by the same or different users At S410, the scaled visual maps are displayed in portions allocated to the maps in a display window. It should be noted if the user opts not to create scaled visual maps, the visual maps are rescaled to contain the original values in the datasets used to create these values.

In an embodiment, the generated visual maps can be sent to user as a report and/or saved in a database for future use. The generated visual maps can be displayed on different display types such as, but not limited to, a display of a desktop computer, and a smartphone. Further, the preparation, generation, and delivery of the visual maps can be initiated automatically according to a predefined rule or schedule.

Figure 5:
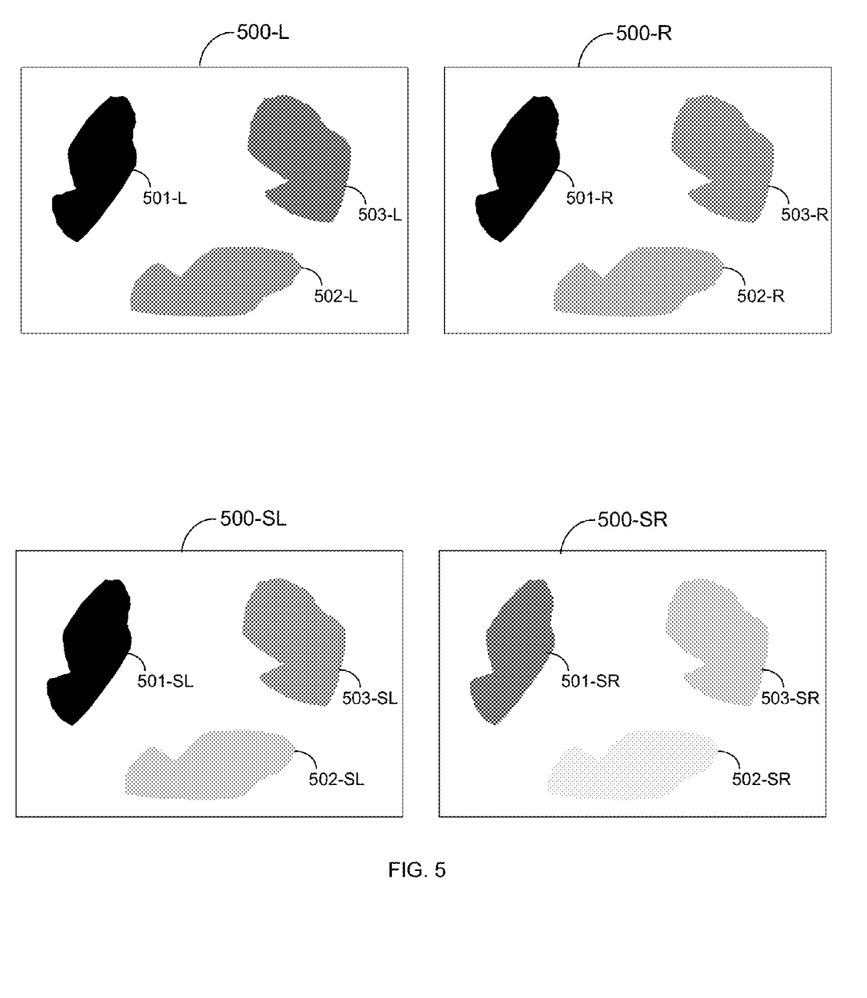
FIG. 5 illustrates a scaling process of visual maps according to one embodiment.

FIG. 5 is a schematic diagram illustrating the scaling process according to one embodiment. The scaling process is performed at S409 as further described herein below with respect to FIG. 4.

In this example, a left visual map 500-L is generated to show a mouse movement with respect to objects 501-L, 502-L, and 503-L in a web page during the last 24 hours. A right visual map 500-R is generated to show the mouse movement with respect to objects 501-R, 502-R, and 503-R in a web page during the last 7 days. In the exemplary FIG. 5, the visual maps are heat maps with grayscale values.

The measured activity is the mouse's movements over certain areas. The maximum times that the mouse was over objects 501-L, 502-L, and 503-L are 110 seconds, 75 seconds, and 45 seconds, respectively. The maximum time that the mouse was over objects 501-R, 502-R, and 503-R is 100 seconds, 45 seconds, and 25 seconds, respectively. As can be noticed in the unscaled maps, both objects 501-L and 501-R are black as they represent maximum values.

To scale the maps both maxValueLeft and maxValueRight are computed. For example, if the number of page views is 100 for both maps, then maxValueLeft=110/100=1.1 and maxValueRight=100/100=1.

Thus, the scaling factor is max(1.1,1)=1.1. The scaled visual maps are shows are 500-SL and 500-SR. The values (colors) of all objects are computed according to the scaling factor. As can be seen in FIG. 5, only object 501-SL in the scaled map 500-SL is colored in black, as the value associated with object 501-SL represents the maximum value among the two objects 501-L and 501-R. It should be further noted that the grayscale scheme in the maps 500-SL and 500-SR is different than the maps 500-L and 500-R. In the example illustrated in FIG. 5, black color represents the maximum value, while the white color represents the minimum value. It should be noted that scaling of the maps can be performed in a secured manner as discussed above.

The embodiments disclosed herein with reference to generation of 2 comparable maps are provided merely for the sake of the simplicity of the description. The disclosed embodiments can be utilized for the generation of more than 2 comparable visual maps.

The various embodiments disclosed herein may be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. A non-transitory computer readable medium is any computer readable medium except for a transitory propagating signal. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating a plurality of comparable visual maps of browsing activity of users, comprising:
   receiving a first set of parameters for generating a first visual map, wherein the first set of parameters includes at least a uniform resource locator (URL) of a webpage on which the browsing activity is monitored;
   retrieving, based on the selected first set of parameters, a first dataset including browsing within a page activity data;
   generating a first graphical visual map using the first dataset and content of the webpage;
   receiving a second set of parameters for generating a second graphical visual map, wherein the second set of parameters is comparable to the first set of parameters;
   retrieving, based on the selected second set of parameters, a second dataset including browsing within a page activity data;

generating a second graphical visual map using the second dataset and the content of the webpage;
scaling each of the first graphical visual map and the second graphical visual map to provide comparable visual representation of values of their respective data sets relative to each other; and
displaying the scaled first graphical visual map and the scaled second graphical visual map in a display window such that each is visible simultaneously in the display window and each is displayed over a respective representation of the content of the webpage.

2. The method of claim 1, wherein the first dataset and the second dataset are retrieved from a database in a secured manner.

3. The method of claim 2, further comprising:
generating a first token based on the first set of data parameters;
generating a second token based on the second set of data parameters; and
accessing the database to retrieve the first data set and the second data set using the first token and the second token, respectively.

4. The method of claim 1, wherein at least one of the first data set and the second data set contains a type of browsing within a page data that is not contained in the other data set.

5. The method of claim 1, wherein each of the first graphical visual map and the second graphical visual map includes at least one visualization layer and at least one data layer rendered over the representation of the content of the web page and wherein the database is secured by limiting access of the at least one visualization layer to the database.

6. The method of claim 1, wherein each of the first graphical visual map and the second graphical visual map includes at least one visualization layer and at least one data layer rendered over the representation of the content of the web page and wherein the at least one data layer of the first graphical visual map is restricted from access by the second graphical visual map.

7. The method of claim 1, wherein the browsing within a page activity data includes at least one of: mouse movement, scrolling of the web page, resizing of a browser window, a click event, keyboard use, orientation change, touch start, touch move, and touch end, for the web page.

8. The method of claim 1, wherein the scaling of the first graphical visual map and the second graphical visual map is proportional to a set of predefined values from the first dataset and from the second dataset.

9. The method of claim 1, wherein each parameter of the first set of parameters and the second set of parameters includes any one of: a data range, a map type, and at least one filter parameter.

10. The method of claim 9, wherein the at least one filter parameter is any of: a date, an event, demographics, technical information, a screen resolution, a traffic source, and a bounce rate.

11. A non-transitory computer readable medium having stored thereon instructions for causing one or more processing units to execute the method according to claim 1.

12. A system generating a plurality of comparable visual maps of users browsing activity, comprising:
a processor; and
a memory configured to the processor and configured to store instructions for causing the processor to:
receive a first set of parameters for generating a first visual map, wherein the first set of parameters includes at least a uniform resource locator (URL) of a webpage on which the browsing activity is monitored;
retrieve, based on the selected first set of parameters, a first dataset including browsing within a page activity data;
generate a first visual map using the first dataset and content of the webpage;
receive a second set of parameters for generating a second graphical visual map, wherein the second set of parameters is comparable to the first set of parameters;
retrieve, based on the selected second set of parameters, a second dataset including browsing within a page activity data;
generate a second graphical visual map using the second dataset and the content of the webpage;
scale each of the first graphical visual map and the second graphical visual map to provide comparable visual representation of values of their respective data sets relative to each other; and
display the scaled first graphical visual map and the scaled second graphical visual map in a display window such that each is visible simultaneously in the display window and each is displayed over a respective representation of the content of the webpage.

13. The system of claim 12, wherein the first dataset and the second dataset are retrieved from a database in a secured manner.

14. The system of claim 12, wherein the system is further configured to:
generate a first token based on the first set of data parameters;
generate a second token based on the second set of data parameters; and
access the database to retrieve the first data set and the second data set using the first token and the second token, respectively.

15. The system of claim 12, wherein at least one of the first data set and the second data set contains a type of browsing within a page data that is not contained in the other data set.

16. The system of claim 12, wherein each of the first graphical visual map and the second graphical visual map includes at least one visualization layer and at least one data layer rendered over the representation of the content of the web page and wherein the at least one data layer of the first graphical visual map is restricted from access by the second graphical visual map.

17. The system of claim 12, wherein the browsing within a page activity data includes at least one of: mouse movement, scrolling of the web page, resizing of a browser window, a click event, keyboard use, orientation change, touch start, touch move, and touch end, for the web page.

18. The system of claim 12, wherein the system is further configured to proportionally scale the first graphical visual map and the second graphical visual map based on a set of predefined values from the first dataset and the second dataset.

19. The system of claim 12, wherein each parameter of the first set of parameters and the second set of parameters includes any one of: a data range, a map type, and at least one filter parameter.

20. The system of claim 19, wherein the at least one filter parameter is at least one of: a date, an event, demographics, technical information, a screen resolution, traffic source, and a bounce rate.

* * * * *

(12) INTER PARTES REVIEW CERTIFICATE (2705th)
United States Patent
Yavilevich et al.

(10) Number: US 10,079,737 K1
(45) Certificate Issued: May 4, 2022

(54) METHOD AND SYSTEM FOR GENERATING COMPARABLE VISUAL MAPS FOR BROWSING ACTIVITY ANALYSIS

(71) Applicants: Arik Yavilevich; Mark Nati Schlesinger

(72) Inventors: Arik Yavilevich; Mark Nati Schlesinger

(73) Assignee: CONTENT SQUARE ISRAEL LTD.

Trial Number:
IPR2021-00416 filed Feb. 5, 2021

Inter Partes Review Certificate for:
Patent No.: 10,079,737
Issued: Sep. 18, 2018
Appl. No.: 14/484,726
Filed: Sep. 12, 2014

The results of IPR2021-00416 are reflected in this inter partes review certificate under 35 U.S.C. 318(b).

INTER PARTES REVIEW CERTIFICATE
U.S. Patent 10,079,737 K1
Trial No. IPR2021-00416
Certificate Issued May 4, 2022

AS A RESULT OF THE INTER PARTES REVIEW PROCEEDING, IT HAS BEEN DETERMINED THAT:

Claims 1-20 are cancelled.

\* \* \* \* \*